United States Patent
Jerg

(10) Patent No.: US 7,886,752 B2
(45) Date of Patent: *Feb. 15, 2011

(54) FILTER

(75) Inventor: Helmut Jerg, Giengen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 1076 days.

This patent is subject to a terminal disclaimer.

(21) Appl. No.: 10/603,531

(22) Filed: Jun. 25, 2003

(65) Prior Publication Data

US 2004/0050774 A1    Mar. 18, 2004

Related U.S. Application Data

(63) Continuation of application No. PCT/EP01/14191, filed on Dec. 4, 2001.

(30) Foreign Application Priority Data

Dec. 29, 2000    (DE) ................................ 100 65 660

(51) Int. Cl.
*B08B 3/00*    (2006.01)

(52) U.S. Cl. ..................... 134/110; 134/56 D; 134/198; 210/149; 210/175; 210/354; 210/356; 210/498

(58) Field of Classification Search ................ 210/108, 210/355, 356, 354, 103, 359, 477, 106, 149, 210/209, 263, 348, 391, 397, 407, 483, 498, 210/499, 175, 184; 137/104.1, 109, 110; 29/896.6, 896.62, 902; 134/109–111, 105, 134/56 D, 57 D, 58 D, 166 R, 198
See application file for complete search history.

(56) References Cited

U.S. PATENT DOCUMENTS

| | | | | |
|---|---|---|---|---|
| 3,122,148 | A * | 2/1964 | Alabaster | 134/56 D |
| 3,179,116 | A * | 4/1965 | Jacobs | 134/56 D |
| 3,335,867 | A * | 8/1967 | Perl | 210/167.31 |
| 4,085,761 | A * | 4/1978 | Grunewald | 134/104.1 |
| 4,783,271 | A * | 11/1988 | Silverwater | 210/742 |
| 5,554,284 | A * | 9/1996 | Bartelt et al. | 210/356 |
| 5,904,163 | A * | 5/1999 | Inoue et al. | 134/56 D |
| 6,210,573 | B1 * | 4/2001 | Marshall | 210/238 |
| 6,221,091 | B1 * | 4/2001 | Khosravi | 606/200 |

FOREIGN PATENT DOCUMENTS

JP    3-32729    *    3/1991

OTHER PUBLICATIONS

Full Translation of Document JP 3-32729, Ikeda et al, published Mar. 1991, Translation downloaded from prosecution history of U.S. Appl. No. 11/592,692 on Sep. 20, 2010.*

* cited by examiner

*Primary Examiner*—Joseph W Drodge
(74) *Attorney, Agent, or Firm*—James E. Howard; Andre Pallapies

(57) ABSTRACT

A filter having a filter body with a plurality of filter openings, each having a passage cross-section which varies automatically in response to a characteristic inherent to a medium flowing through the openings to filter the medium.

10 Claims, 1 Drawing Sheet

FILTER

Figure 1:
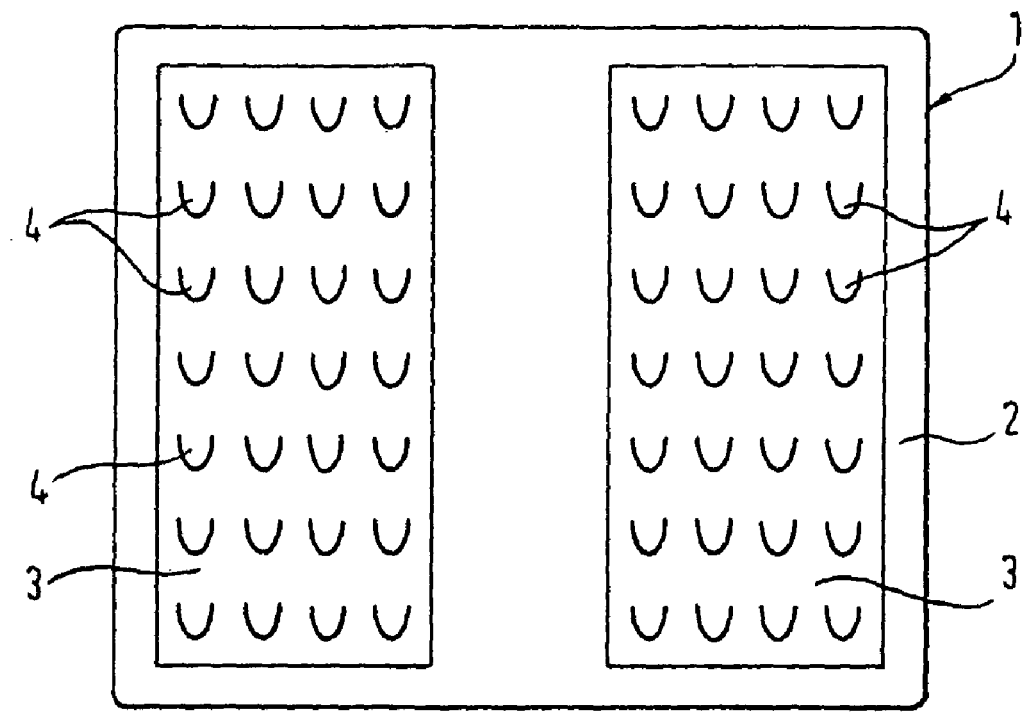

The present invention relates to a filter.

Filters are used in technology in many instances or in many processes to separate out particles contained in a medium passing through the filter. Filters are therefore used in dishwashing machines in particular to filter out food remainders contained in the rinse water. In dishwashing machines there is the particular problem of having to then remove the separated food remainders from the filter.

To solve this problem two panes with parallel longitudinal slots are provided in a self-cleaning filter, known from DE-A1-29 45 929, which are on one hand arranged offset to one another with respect to the slot direction by 90° and on the other hand are arranged to move axially relative to one another. In one position the panes rest on one another, with the intersecting longitudinal slots thus forming small square passage openings, effectively trapping particles which are larger than the passage cross-section of these small passage openings. Cleaning the filter is performed by altering the direction of flow, with at least one filter pane being shifted axially relative to the other filter pane, so that from this point on the longitudinal slots form the passage openings. The previously separated particles can be removed through these longitudinal slots which are substantially larger in cross-section, so that the filter is again clear. This type of filter design is structurally expensive. There is also the danger of jamming the mobile filter panes, and a change in the direction of flow of the medium passing through the filter is necessary to complete the cleaning procedure.

The object of the invention is to provide a filter which no longer embodies these disadvantages.

The solution to this task is achieved according to the present invention by the passage cross-section of the filter openings varying automatically, depending on a variable inherent to the medium passing through the filter. To be able to perform cleaning in such a filter for example, it only requires the relevant variable inherent to the medium flowing through the filter. The modification in cross-section of the filter openings caused by such a change enables the filter to be rinsed free of deposited particles. The filter consists of a single part only, which is arranged fixed. This means that jamming, as may occur in the case of a detachable filter, is no longer possible. A one-piece filter also means less material expenditure. The alteration to the variable inherent to the medium, e.g. temperature or flow rate, is easier to achieve than a change in the direction of flow.

A particularly advantageous embodiment of the filter is characterised in that the filter openings are screened or covered over by means, whose state relative to the filter openings can be altered under the influence of the heat of the medium passing through the filter. In this way the passage cross-section of the filter openings can be influenced, depending on the temperature of the medium flowing through the filter. Since in many technical processes a change in temperature occurs in the medium passing through the filter, cleaning of the filter is practically compulsory.

A structurally particularly simple design of the filter results from the elements being punched from the filter openings in the manner of lugs. The tongue-like elements pivot out of the filter openings at a specific temperature, resulting in enlarging of the passage cross-section.

In a particularly advantageous manner the elements are designed as a shape memory alloy or as bimetal elements. Such alloys change their shape or state, for example under the influence of heat. That is, when a certain temperature is reached they assume another form or take up another state and return to their original shape or state whenever the original temperature prevails. Because in many technical processes a change in temperature occurs in the medium passing through the filter, cleaning of the filter is thus practically compulsory.

Another embodiment of the filter is characterised in that the filter openings are screened or covered over by flap-like elements, whereby these elements are held in a starting state by and can be adjusted to another position by the flow rate of the medium passing through the filter in the sense of a change in the cross-section of the filter openings.

A filter of the abovementioned type can be used to particular advantage in a dishwashing machine. In a dishwashing machine the filter serves to filter out food remainders contained in the rinse water. This makes it necessary to rinse away deposited food remainders from the filter while running the rinsing cycle. Since the rinse water is at a different temperature during the individual rinsing procedures, e.g. prewash, cleaning, spray rinse, deep rinse, sections are formed during a temperature-dependent change to the passage cross-sections during the rinsing cycle, in which the cross-section of the filter openings is enlarged to the extent where deposited food remainders can be removed via the filter openings. This gives rise to a necessary self-cleaning operation of the filter.

Figure 2:
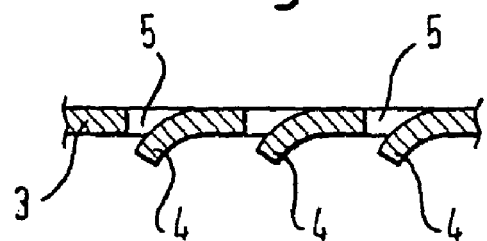
Figure 3:
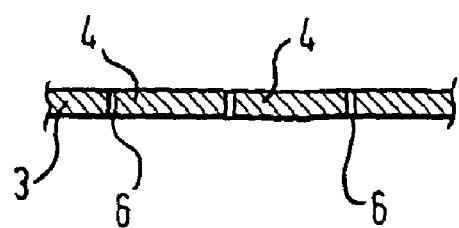

The invention will now be explained in greater detail with reference to the embodiments illustrated in the diagram, in which:

FIG. 1 shows a plate-like filter, with filter openings, in which tongue-like clips are punched out, FIG. 2 shows a partial cross-section of the filter in a state in which the tongue-like clips are pivoted out of the filter openings, and FIG. 3 shows a partial cross-section of the filter in a state in which the tongue-like clips lie in the plane of the plate-like filter body.

Reference numeral 1 designates a filter which has a plate-like body 2. This plate-like body 2 bears two inserts 3, whose material comprises a shape memory alloy. Such alloys change their form or state for example under the influence of heat. That is, when a specific temperature is reached they assume another form or take up another state and return to their original form or state whenever the original temperature prevails.

Tongue-like clips 4 are punched out on the inserts 3. These tongue-like clips 4 vary their state under the influence of heat. At a certain temperature these clips 4 bend or pivot, as shown in FIG. 2. Correspondingly large passage openings 5 occur in the inserts 3 as a result of such bending or pivoting of the clips.

At another, for example higher temperature the clips 4 assume a state, in which they lie in the plane of the inserts 3. Only narrow slots 6, resulting from punching the clips 4, therefore remain as passage cross-sections, as evident from in FIG. 3. Since these punched slots 6 are very narrow, ca. 0.2 mm, only correspondingly small particles contained in the medium can pass through these punched slots 6. In this case the filter 1 has a high filter effect, that is, many particles are deposited. If the abovedescribed pivoting of the clips 4 occurs as a result of a change in temperature, the deposited particles are removed through the enlarged passage cross-sections 5 and the filter 1 is again clear.

Instead of the clips 4 which can adjust their state through a change in temperature, the passage openings 5 of the filter 1 can for example also be screened or covered over by flap-like elements, which e.g. depending on the flow rate of the medium passing through the filter 1 are pivoted in the sense of enlarging or reducing the cross-section. Cleaning the filter 1 only requires a change in the flow rate. Such an alteration to the flow rate is easy to make.

The invention claimed is:

1. A filter, comprising:
   a filter body having a plurality of filter openings for filtering a medium flowing through said openings; and
   each of said openings being screened or covered by elements whose state relative to said filter openings vary under the influence of the heat of said medium flowing through said openings.

2. The filter according to claim 1, including said elements are punched out of said filter body in the shape of tongues positioned in said filter openings.

3. The filter according to claim 2, including said tongue shaped elements are formed from a shape memory alloy material.

4. The filter according to claim 2, including said tongue shaped elements are formed from a bimetal material.

5. The filter according to claim 1, including said elements configured as clips, with said clips, in one state thereof, being positioned in said filter openings and lying in a plane of said filter body, whereupon said filter openings are screened by said clips, and, in another state thereof wherein said clips have been subjected the influence of the heat of said medium flowing through said openings, said clips have been moved by a selected one of bending and pivoting out of said plane of said filter body, whereupon said filter openings are no longer completely screened by said clips.

6. A dishwashing machine, the machine including a water medium utilized in the machine, comprising:
   a filter for filtering the water medium in said machine;
   said filter including a filter body having a plurality of filter openings for filtering the medium flowing through said openings; and
   each of said openings having a passage cross-section which varies automatically in response to a characteristic inherent to said medium flowing through said openings, including said filter openings being screened or covered by elements whose state relative to said filter openings vary under the influence of the heat of said medium flowing through said openings.

7. The dishwashing machine according to claim 6, including said elements are punched out of said filter body in the shape of tongues positioned in said filter openings.

8. The dishwashing machine according to claim 7, including said tongue shaped elements are formed from a shape memory alloy material.

9. The dishwashing machine according to claim 7, including said tongue shaped elements are formed from a bimetal material.

10. The dishwashing machine according to claim 6, including said filter openings being screened or covered by flap-like elements, said flap-like elements having a first substantially covering position by a force effect of said medium flowing through said openings and can be adjusted to a second increased passage opening by an increased flow rate of said medium flowing through said openings.

* * * * *